United States Patent [19]
Lau et al.

[11] Patent Number: 5,577,069
[45] Date of Patent: Nov. 19, 1996

[54] SIGNALLING METHOD AND STRUCTURE SUITABLE FOR OUT-OF-BAND INFORMATION TRANSFER IN COMMUNICATION NETWORK

[75] Inventors: Hung-Wah A. Lau, Los Altos; Ching Huang, Sunnyvale; Ramin Shirani, Morgan Hill; Michael J. Woodring, Concord, all of Calif.

[73] Assignee: National Semiconductor Corporation, Santa Clara, Calif.

[21] Appl. No.: 353,464

[22] Filed: Dec. 9, 1994

[51] Int. Cl.$^6$ .................................................. H04B 14/04
[52] U.S. Cl. ............................. 375/242; 375/220; 341/55; 341/60; 370/85.3
[58] Field of Search ................................. 375/220, 219, 375/222, 242, 253, 254; 341/20, 55, 60, 176; 370/85.3, 85.8, 99, 110.1, 110.4

[56] References Cited

U.S. PATENT DOCUMENTS

| | | | |
|---|---|---|---|
| 5,257,288 | 10/1993 | Moser | 375/242 |
| 5,262,964 | 11/1993 | Bonsall et al. | 375/242 |
| 5,287,178 | 2/1994 | Acampora et al. | 375/242 |

OTHER PUBLICATIONS

"Physical Layer for 100Mb/s Operation (100Base-X)," Carrier Sense Multiple Access with Collision Detection (CSMA/CD) Access Method & Physical Layer Specifications, Draft Supp. to ANSI/IEEE Std. 802.3, 1993 Edition, Copyright 1994.
"IEEE Link Task Force Autodetect, Specification for NWay Autodetect," Version 1.0, 10 Apr. 1994.
"MAC Parameters, Physical Layer, Medium Attachment Units and Repeater for 100Mb/s Operation (version 1.0)," Carrier Sense Multiple Access with Collision Detection (CSMA/CD) Access Method and Physical Layer Specifications, Draft Supp. to 1993 version of ANSI/IEEE Doc. 807.3u/d2 Std 802.3, Copyright 1994.

Primary Examiner—Stephen Chin
Assistant Examiner—Don Vo
Attorney, Agent, or Firm—Skjerven, Morrill, MacPherson, Franklin & Friel; Ronald J. Meetin; Paul J. Winters

[57] ABSTRACT

A high-speed out-of-band signalling technique for transferring information such as station status information between stations in a communication network, typically a local-area network, involves sequentially generating a plurality of n-bit sequence segments, where n is at least 3. Each bit is either a first binary value or a second binary value. Each sequence segment is coded with one of a plurality of different n-bit code groups divided into a first code group and a set of second code groups. The n bits in the first code group are all the first binary value—e.g., all "1s". None of the second code groups contain a pair of non-contiguous bits of the second binary value—e.g., none of the second code groups contains two "0s" separated by at least one other bit. The sequence segments are outputted in the order that they were generated to produce a special bit sequence which carries the desired information. The station status information typically includes configuration capability, flow control parameters, and integrity control parameters.

42 Claims, 6 Drawing Sheets

TRANSMIT

RECEIVE

SIGNALLING METHOD AND STRUCTURE SUITABLE FOR OUT-OF-BAND INFORMATION TRANSFER IN COMMUNICATION NETWORK

FIELD OF USE

This invention relates to electronic communication. In particular, this invention relates to methods and structures for out-of-band communication in local-area networks.

BACKGROUND

A local-area network ("LAN") is a communication system that enables a group of communication stations located within a limited geographical area such as an office, a building, or a cluster of buildings to electronically transfer information among one another. One form of communication station is data terminal equipment ("DTE"), typically a personal computer or a work station. DTE originates messages and/or constitutes the ultimate destination for messages. DTE also provides communication control functions. Other forms of communication stations are repeaters (or hubs), file servers, and bridges.

Information transferred between communication stations in a LAN can be generally placed in the categories of (a) data, (b) control information relating to start/stop of data transmission, and (c) other control information. As used here with respect to a communication station in a LAN, the term "in-band" generally refers to periods in which the station is transmitting packets of data and control information relating to start/stop of data transmission to another communication station in the LAN. The term "out-of-band" is basically the converse of "in-band". As used here with respect to a communication station in a LAN, "out-of-band" thus generally refers to periods when the station is not transmitting packets of data and control information relating to start/stop of data transmission. During out-of-band periods, the communication station may send other types of control information, such as configuration or linkage information, to another communication station in the LAN.

Communication stations in a LAN exchange data and control information with one another by following a fixed protocol which defines the network operation. The ISO Open Systems Interconnection Basic Reference Model establishes a seven-layer LAN communication model. The two lowest layers in the model are the physical layer and the data link layer. The physical layer consists of modules that specify (a) the physical media which interconnects the communication stations and over which information is to be electronically transmitted, (b) the manner in which the communication stations interface to the physical transmission media, (c) the process for transferring information over the physical media, and (d) the protocol of the information stream. The data link layer includes a logical link control sublayer and a media access control ("MAC") sublayer that interfaces with the physical layer directly or by way of a reconciliation sublayer.

IEEE Standard 802.3, Carrier Sense Multiple Access with Collision Detection ("CSMA/CD") Access Method and Physical Layer Specifications, is one of the most widely used standards for the physical layer and the MAC sublayer. Commonly referred to as Ethernet, IEEE Standard 802.3 prescribes various rates for transferring data.

The 10Base-T protocol of IEEE Standard 802.3 deals with transferring data at a rate of 10 megabits/second ("Mbps") over twisted-pair copper cables. Consider a LAN containing two communication stations that can transfer data only at the 10-Mbps rate of the 10Base-T protocol. Before one of the stations starts transmitting data to the other, the intended transmitting station first establishes that there is a 10Base-T communication link with the intended receiving station. This is accomplished with link pulses that each station transmits during out-of-band periods directly after power-up. The link pulses, commonly termed "normal" link pulses, consist of 100-ns pulses provided every 16 ms±8 ms. When the intended transmitting station receives a sufficient number of normal link pulses to indicate the presence of a link to a communication station capable of receiving data at the 10Base-T rate, the transmitting station begins sending data.

A protocol referred to as 100Base-TX is under consideration for expanding IEEE Standard 802.3 to accommodate data moving at an effective rate of 100 Mbps through twisted-pair copper cables of presently existing types. The 100Base-TX protocol leverages on the ANSI X3T12 standard, generally termed FDDI for fiber data distributed interface, which covers the transmission of data at 100 Mbps over fiber optical cables. In fact, the proposed expansion of IEEE Standard 802.3 includes a protocol termed 100Base-FX for sending data over fiber optical cables at an effective rate of 100 Mbps. For matters common to 100Base-TX and 100Base-FX, the two protocols are known as 100Base-X.

Under the proposed 100Base-X protocol, certain control information is incorporated into a 100Base-X data stream before it is placed on a copper or fiber optical cable. In particular, the MAC sublayer in the transmitting station supplies data in 4-bit code groups often referred to as nibbles. The physical layer in the transmitting station contains a physical coding sublayer ("PCS") that converts the 4-bit code groups into 5-bit code groups often referred to as symbols. Each 5-bit code group has the same total bit duration, approximately 40 ns, as a 4-bit code group. The 4-bit/5-bit conversion performed in the PCS increases the number of available code groups. This provides a capacity for incorporating control information into the data stream. After scrambling, serialization, and additional coding to reduce electromagnetic interference, the resulting coded information moves at 125 Mbps on the cable. The 100Base-X mapping between the 4-bit MAC data code groups and the 5-bit PCS code groups is given in the following table:

TABLE 1

| 5-bit PCS Code Group | Name | 4-bit MAC Code Group or Meaning |
|---|---|---|
| 11110 | 0 | 0000 |
| 01001 | 1 | 0001 |
| 10100 | 2 | 0010 |
| 10101 | 3 | 0011 |
| 01010 | 4 | 0100 |
| 01011 | 5 | 0101 |
| 01110 | 6 | 0110 |
| 01111 | 7 | 0111 |
| 10010 | 8 | 1000 |
| 10011 | 9 | 1001 |
| 10110 | A | 1010 |
| 10111 | B | 1011 |
| 11010 | C | 1100 |
| 11011 | D | 1101 |
| 11100 | E | 1110 |
| 11101 | F | 1111 |
| 11111 | I | Idle |
| 11000 | J | First SSD code group, used with K |
| 10001 | K | Second SSD code group, used with J |
| 01101 | T | First ESD code group, |

TABLE 1-continued

| 5-bit PCS Code Group | Name | 4-bit MAC Code Group or Meaning |
|---|---|---|
| 00111 | R | used with R Second ESD code group, used with T |
| 00100 | H | Indicates transmit error |
| 00000 | V | Invalid |
| 00001 | V | Invalid |
| 00010 | V | Invalid |
| 00011 | V | Invalid |
| 00101 | V | Invalid |
| 00110 | V | Invalid |
| 01000 | V | Invalid |
| 01100 | V | Invalid |
| 10000 | V | Invalid |
| 11001 | V | Invalid |

Half of the 5-bit code groups correspond to the 4-bit code groups. Part of the other half of the 5-bit code groups are used for control purposes. The remainder of the other half of the 5-bit code groups are not utilized and, therefore, are labeled as invalid in Table 1. The acronyms "SSD" and "ESD" in Table 1 respectively mean start-of-stream delimiter and end-of-stream delimiter.

Referring to the drawings, FIG. 1 illustrates the MAC-to-PCS 4-bit/5-bit conversion in more detail. Data from the MAC sublayer is provided during in-band periods referred to as frames. Each MAC frame consists of a preamble, a start-of-frame delimiter ("SFD"), and a data section. The preamble is formed with up to seven preamble octets, each consisting of eight bits—i.e., a pair of 4-bit code groups. The start-of-frame delimiter takes up one octet. The data section contains 46–1500 pairs of 4-bit code groups. Each bit is a binary "0" or a binary "1".

A pair of out-of-band periods referred to as inter-frame gaps enclose each MAC frame. The acronym "IFG" in FIG. 1 means inter-frame gap. During the inter-frame gaps, the MAC sublayer supplies no information. The bits in each MAC inter-frame gap thus are "0s".

In converting the MAC data into the 100Base-X PCS stream of 5-bit code groups, the 10-bit SSD code-group pair JK is substituted for the first preamble octet (i.e., the first two 4-bit preamble code groups) in the MAC frame so as to indicate the start of the 100Base-X PCS stream. Each pair of 4-bit MAC data code groups is converted into a corresponding pair of 5-bit 100Base-X code groups according to Table 1. At the end of the MAC frame, the PCS appends the 10-bit ESD code-group pair TR to indicate the end of the 100Base-X PCS stream.

The portion of the 100Base-X inter-frame gap following end-of-stream delimiter TR constitutes the out-of-band period for the physical layer. During this part of the inter-frame gap, the PCS furnishes the idle code group I to indicate the presence of a good communication link. As indicated in Table 1, each I code group consists of five "1s". A mapping opposite to that described above occurs at the communication station when it receives 100Base-X data from another communication station.

The physical layer in one communication station asserts a carrier-sense signal whenever the physical layer receives 100Base-X data from another communication station. In particular, carrier sense is asserted when a pair of non-contiguous "0s" are detected within any 10-bit portion of the overall stream of 5-bit code groups coming into the PCS during data reception. A pair of "0s" are "non-contiguous" within a 10-bit stream segment when two "0s" are separated by at least one other code bit. For example, the 10-bit segments (0101111111) and (1111111000) both contain a pair of non-contiguous "0s", whereas the 10-bit segment (1111001111) does not contain a pair of non-contiguous "0s". Carrier sense is de-asserted when the ESD signal pair TR is detected and also when ten contiguous "1s" such as the signal pair II, are detected in the overall 100Base-X incoming bit stream.

As with the 10Base-T protocol, a prerequisite for enabling one communication station to transmit data to another in accordance with the 100Base-X protocol is for the transmitting station to establish a 100Base-X communication link with the receiving station. This involves initially determining whether the receiving station can receive (i.e., properly process) 100Base-X data and, if so, periodically verifying that the receiving station remains capable of receiving 100Base-X data.

In specifying how a 100Base-X communication link is to be set up when the transmission medium consists of twisted-pair copper cables, the proposed extension of IEEE Standard 802.3 to include the 100Base-X protocol establishes the NWay autodetect process to take into account the fact that two communication stations which meet IEEE Standard 802.3 may be able to communicate solely according to 100Base-TX, solely according to 10Base-T, according to either 10Base-T or 100Base-TX, according to another protocol such as 100Base-T4, or according to none of these protocols. See "MAC Parameters, Physical Layer, Medium Attachment Units and Repeater for 100 Mb/s Operation (version 1.0)," CSMA/CD Access Method & Physical Layer Specifications, Draft Supplement to 1993 version of ANSI/IEEE Document #802.3u/d2, Std 802.3, Chapter 28, 24 Jul. 1994. Also see "IEEE Link Task Force Autodetect", Specification for NWay Autodetect, National Semiconductor, Version 1.0, 10 Apr. 1994.

For example, one communication station may only have 100Base-TX capability, while another communication station can operate at 100Base-TX and 10Base-T. Data is then transmitted according to the 100Base-TX protocol. Alternatively, each communication station may be capable of communicating at both 100Base-TX and 10Base-T. Although the two stations could theoretically communicate according to either of these two protocols, 100Base-TX is preferable because it is much faster. Finally, one station may solely utilize 10Base-T while another station solely utilizes 100Base-TX so that the stations cannot communicate directly with each other.

Under the NWay autodetect procedure, a communication station contains a link negotiator which produces a burst of "fast" link pulses that carry information specifying the station's processing capability. The fast link pulses indicate whether the station operates in 10Base-T, 100Base-TX, or 100Base-T4 mode. The fast link pulses also indicate whether the station can simultaneously transmit and receive data (full duplex) or can do only one of transmitting and receiving data at a time (half duplex). The control information contained in the fast link pulses is placed in certain ones of thirty-two 16-bit management control registers contained in the PCS.

Two communication stations that are provided with NWay link negotiators exchange fast link pulses until each station determines that the other is applying the NWay procedure. A communication link is then set up. Data transmission subsequently occurs at the highest common denominator of data transmission capability. For example, if one station operates at 100Base-TX in full duplex while the other can operate either at 10Base-T or 100Base-TX in half duplex, data transmission occurs at the 100Base-TX data rate in half duplex. If there is no common denominator of data transmission capability, neither station transmits data to the other.

Each burst of fast link pulses contains 16 bits of information. The fast-link pulse bursts are provided at the same frequency as the normal 10Base-T link pulses. That is, the spacing between the beginnings of the fast link pulse bursts is typically 16 ms. Accordingly, the average bit transfer rate for the fast-link pulse bursts typically is only 1 kilobit/second.

The NWay autodetect procedure is a useful technique for establishing the optimal mode by which two communication stations can exchange linkage and capability information in accordance with IEEE Standard 802.3. However, the bit rate for the fast link pulses is tied to the 10Base-T protocol and thus is quite low for the 100Base-X protocol in which data moves approximately ten times faster. It would be highly desirable to have an out-of-band signalling method for transferring station status information, including linkage information, at a considerably faster rate than in current NWay-based 100Base-X LAN applications without causing carrier sense to be falsely asserted and without introducing information fragments that may clutter the communication network.

GENERAL DISCLOSURE OF THE INVENTION

The present invention furnishes such an out-of-band signalling technique. During out-of-band periods, the signalling method of the invention typically transfers station status information at an average bit rate in excess of 10 Mbps between a pair of communication stations that operate according to the 100Base-X protocol during in-band periods. This is more than four orders of magnitude greater than the out-of-band bit transfer rate typically achieved with the NWay procedure.

The present invention enables communication stations to exchange various types of information dealing with station status. As in NWay, a transmitting communication station can inform a receiving communication station of the transmitting station's configuration capability, including duplexing capability. This includes configuration information covered by NWay—i.e., 100Base-TX, 10Base-T, and so on for communicating via twisted-pair copper cables-as well as configuration information not currently dealt with in NWay—e.g., 100Base FX for data transfer on fiber optical cables. As such, the signalling technique of the invention constitutes a fast-acting complement to NWay for setting up a communication link between two stations.

Importantly, the present signalling technique can be employed to communicate data flow conditions such as congestion and network priority that affect the capability of each station to receive data. In addition to providing for station status information to be exchanged between two communication stations during the period before a communication link is set up between the stations, the signalling technique of the invention provides for station status information to be exchanged during out-of-band periods that occur between packets of data after the communication link is established. For example, once the link is set up and one of the stations is sending data to the other, the receiving station can employ the present signalling technique to inform the transmitting station that the receiving station is congested and thus that the transmitting station needs to defer data transmission until the congestion is alleviated.

The signalling method of the invention specifically entails sequentially generating a plurality of n-bit sequence segments, where the number n of bits in each sequence segment is at least 3. In the 100Base-X protocol, n is 5. Each bit in each sequence segment is a first binary value, such as "1", or a second binary value, such as "0" opposite to the first binary value.

Each sequence segment is coded with a selected one of a plurality of different n-bit code groups allocated into a first code group and a set of second code groups. The n-bits in the first code group are all the first binary value. In the 100Base-X protocol where n is 5, the first code group consists of 5 "1s" and thus corresponds to the idle code group I.

The principal characteristic of the second code groups is that none of them contains a pair of non-contiguous bits of the second binary value. For example, when n is 5 and the second binary value is "0", the 5-bit code group (11100) can be one of the second code groups. Although (11100) contains two "0s" the "0s" adjoin each other and therefore are not non-contiguous. On the other hand, the 5-bit code group (11000) cannot be one of the second code groups since the "0s" at the third and fifth bit positions are separated by the fourth code bit (here a "0" but could also be a "1") and thus constitute non-contiguous "0s". In 100Base-X applications, the second code groups include at least part of the eight 5-bit code groups identified by the names "0", "7", "9", "B", "D", "E", "F", and "R".

With the n-bit sequence segments having been generated in the preceding manner, the sequence segments are outputted according to the order in which they were generated to produce a special bit sequence that carries the station status information.

The coding in the special bit sequence is preferably done in such a way that no pair of non-contiguous bits of the second binary value occur in any m consecutive bits in the sequence, where m is at least n+1. In a preferred case, m equals 2n. When n is 5 and the second binary value is "0" this means that no pair of non-contiguous "0s" occur in any ten consecutive bits in the sequence. This limitation is automatically met by placing at least two sequence segments coded with the first code group—e.g., the I code group—between each pair of sequence segments coded with the second code groups.

As mentioned above, carrier sense is generated in the 100Base-X protocol whenever two non-contiguous "0s" are detected in any 10-bit portion of the 100Base-X output physical layer stream. Since the special bit sequence generated by the present method is preferably arranged so that no pair of non-contiguous "0s" occur in any ten consecutive bits in the sequence, carrier sense is not falsely asserted during out-of-band information transfer. Likewise, information fragments that can damage the transmission of data are not introduced into the system. The net result is that the invention provides an efficient, extremely fast, out-of-band technique for exchanging station status information between stations in a communication system such as a LAN.

BRIEF DESCRIPTION OF THE DRAWINGS

Like reference symbols are employed in the drawings and in the description of the preferred embodiments to represent the same, or very similar, item or items.

DESCRIPTION OF THE PREFERRED EMBODIMENTS

Figure 2:
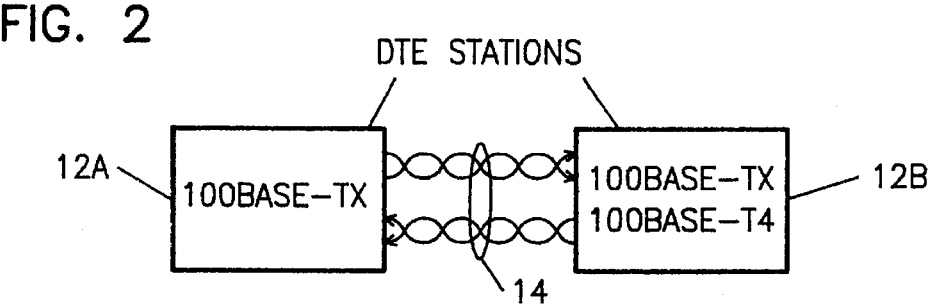
FIG. 2 is a system diagram of a typical two-station LAN that can utilize the out-of-band signalling method of the invention.

Referring to FIG. 2, it illustrates a two-station LAN in which high-speed out-of-band communication is performed in accordance with the teachings of the invention for transferring information about communication station status such as configuration capability (technology as well as duplexing), congestion, network priority, and remote fault. The LAN shown in FIG. 2 consists of two DTE communication stations 12A and 12B. A pair of twisted-pair copper cables 14 interconnect DTE stations 12A and 12B.

DTE communication stations 12A and 12B are capable of transferring information in accordance with various twisted-pair protocols of IEEE Standard 802.3. In particular, stations 12A and 12B can both communicate according to 100Base-TX. Station 12B can also communicate according to 100Base-T4. Both of stations 12A and 12B are provided with capabilities for high-speed out-of-band signalling in accordance with the invention.

Figure 3:
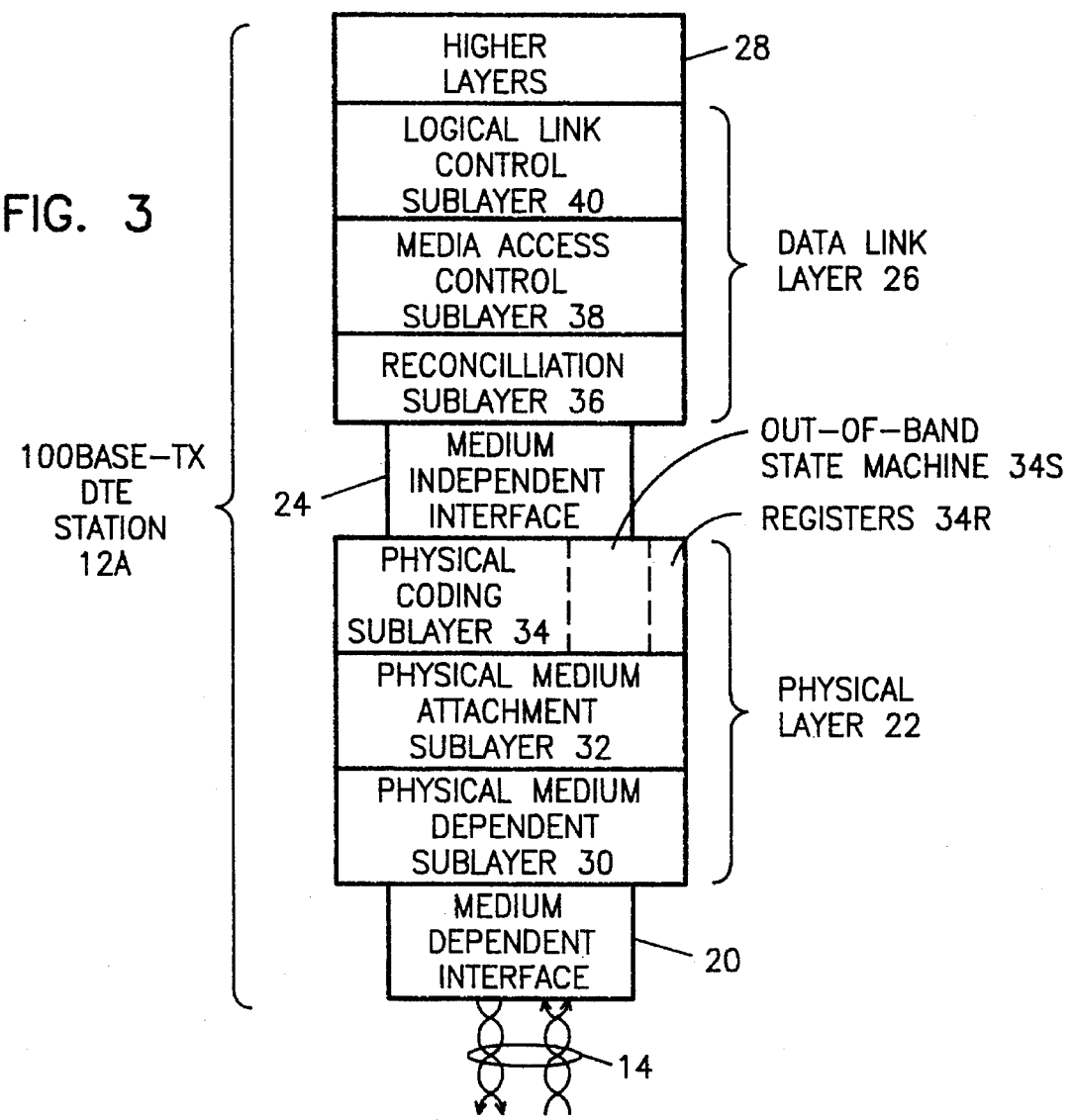
FIG. 3 is a block diagram of a DTE communication station suitable for use in the LANs of FIGS. 2 and 7 for out-of-band signalling in accordance with the invention.

FIG. 3 depicts the internal organization of 100Base-TX DTE station 12A in FIG. 2. The organizational structure shown in FIG. 3 also largely represents the internal organization of the 100Base-TX portion of DTE station 12B.

As illustrated in FIG. 3, DTE station 12A consists of a medium dependent interface 20, a physical layer 22, a medium independent interface 24, a data link layer 26, and higher layers 28. Physical layer 22 is formed with a physical medium dependent ("PMD") sublayer 30, a physical medium attachment ("PMA") sublayer 32, and a physical coding sublayer (again "PCS") 34. Data link layer 26 consists of a reconciliation sublayer 36, a media access control (again "MAC") sublayer 38, and a logical link control sublayer 40. Subject to the enhancements of the invention, DTE station 12A generally meets the operational and performance specifications of the 100Base-TX protocol. In regard to components 20, 24, and 30–38, see "MAC Parameters, Physical Layer, Medium Attachment Units and Repeater for 100 Mb/s Operation (version 1.0)", CSMA/CD Access Method and Physical Layer Specifications, Draft Supplement to 1993 version of ANSI/IEEE Document #802.3u/d2 Std 802.3, 24 Jul. 1994.

During 100Base-X data transmission according to the 100Base-TX protocol, MAC sublayer 38 supplies binary NRZ (non-return-to-zero) data to PCS 34 by way of medium independent interface 24 and, as appropriate, reconciliation sublayer 36. The NRZ data is provided in the form of 4-bit code groups coming in at 25 Mbps on each of four parallel lines to produce a cumulative rate of 100 Mbps. PCS 34 converts the 4-bit code groups into five-bit code groups that are furnished on five parallel lines at a cumulative rate of 125 Mbps. The 5-bit code groups still bear the NRZ coding.

In performing the 4-bit/5-bit conversion, PCS 34 employs the signalling technique of the invention to introduce station status information into the out-of-band portions of the resulting 5-bit PCS data stream. The out-of-band portions basically consist of (a) the period preceding the control bits that identify the start of the first data packet and (b) the inter-frame gaps—i.e., the periods between the periods during which DTE station 12A sends data encapsulated by control information relating to the start/stop of data transmission.

PMD sublayer 30 and PMA sublayer 32 (jointly "PMD/A sublayer 30/32") perform additional operations on the 5-bit PCS data stream. In particular PMD/A sublayer 30/32 scrambles the 5-bit PCS data stream using an appropriate pseudo-random number function. PMD/A sublayer 30/32 then serializes the scrambled 5-bit stream and applies an NRZI (non-return-to-zero/invert-on-one) coding to the serialized bit stream. After converting the 1-bit NRZI stream into a differential format, PMD/A sublayer 30/32 applies an MLT-3 (multi-level transmit/three levels) coding to produce a pair of trinary differential signals that move at a data rate of 125 Mbps. The combination of the scrambling, NRZI coding, and MLT-3 coding reduces electromagnetic interference. The scrambled MLT-3 differential stream is then supplied through medium dependent interface 20 for transmission on one of twisted-pair cables 14.

Basically the opposite occurs during 100Base-X data reception under the 100Base-TX protocol. When a 100Base-X scrambled MLT-3 differential stream comes in at 125 Mbps on the other of twisted-pair cables 14, PMD/A sublayer 30/32 decodes the MLT-3 stream to produce a binary differential bit stream that bears NRZI coding. After applying an NRZI-to-NRZ decode and converting the scrambled differential NRZ stream to a single-ended form, PMD/A sublayer 30/32 de-serializes the single-ended stream to generate 5-bit code groups that are furnished at 25 Mbps on each of five parallel lines to produce a cumulative rate of 125 Mbps. PMD/A sublayer 30/32 also descrambles the 5-bit stream using a pseudo-random number function that matches the pseudo-random number function employed for scrambling the stream.

PCS 34 contains a code-group alignment circuit consisting of a set of three 5-bit registers that form a 15-bit shift register. Each consecutive group of five bits coming in on the five output lines from PMD/A sublayer 30/32 is shifted through the three 5-bit registers in three clock cycles. During each clock cycle, the fifteen bits in the three 5-bit registers are interrogated for control information that indicates start of data transmission-i.e., start-of-stream delimiter-so as to align the 5-bit code groups. Each 10-bit portion of the fifteen bits is also examined to see if it contains a pair of non-contiguous "0s". If so, carrier sense is asserted.

PCS 34 converts the data-containing portions of the 5-bit de-serialized NRZ code groups into 4-bit code groups according to the reverse of the MAC-to-PCS 4-bit/5-bit mapping used during data transmission. The 4-bit code groups are supplied at 25 Mbps on 4 parallel lines, thereby reducing the cumulative data rate to 100 Mbps. The 4-bit code groups are provided through medium independent interface 24 and, as appropriate, reconciliation sublayer 36 to MAC sublayer 38.

Before doing the 5-bit/4-bit conversion, station status information which is embedded in the out-of-band portions of the 5-bit NRZ stream and which meets the requirements of the present-out-band signalling technique is recovered from the 5-bit stream. The station status information is written into one or more local registers, preferably one or more of a stack 34R of thirty-two 16-bit management control registers contained in PCS 34.

The out-of-band signalling technique of the invention is typically employed in communication stations, such as DTE stations 12A and 12B, capable of operating according to the 100Base-X protocol. In such LAN applications, the present out-of-band signalling technique entails selectively placing certain "non-I" 5-bit code groups in the idle bit sequences that precede and follow each in-band 100Base-X PCS data-containing segment produced in the physical coding sublayers of the physical layers. That is, certain of the sequentially generated 5-bit segments of the normally idle out-of-band portions of the overall 100Base-X PCS output bit stream are coded with non-I code groups.

Each so-encoded idle bit sequence is referred to here as a "coded 100Base-X idle PCS stream". The remainder of the overall 100Base-X PCS output bit stream—i.e., the data packets along with the delimiters and the remainders of the preambles—is referred to here as the "100Base-X data-containing PCS stream". A "non-I" 5-bit code group means a 5-bit code group other than the idle code group I that consists solely of "1s".

Non-I 5-bit code groups are distributed across a coded 100Base-X idle PCS stream in such a way that no pair of non-contiguous "0s" occur in any 10-bit portion of the coded 100Base-X idle PCS stream. Since the carrier sense signal is asserted when a pair of non-contiguous "0s" are detected in a 10-bit portion of the overall 100Base-X PCS output stream, arranging the coded 100Base-X idle PCS stream in this way avoids false assertions of carrier sense. To meet the requirement that non-contiguous "0s" not occur in any 10-bit portion of the coded 100Base-X idle PCS stream, each non-I 5-bit code group placed in the coded 100Base-X idle PCS stream must not have a pair of non-contiguous "0s". The non-I 5-bit code groups that can be placed in the coded 100Base-X idle PCS stream are thereby limited to the code groups given in the following table:

TABLE 2

| Name | Non-I 5-bit Code Groups Lacking Non-contiguous "0s" |
| --- | --- |
| 0 | 11110 |
| 7 | 01111 |
| 9 | 10011 |
| B | 10111 |
| D | 11011 |
| E | 11100 |
| F | 11101 |
| R | 00111 |
| W | 11001 |

The code group (11001), identified here by the name W, is an invalid code group for the 100Base-X data-containing PCS stream in which actual data is transmitted. As a consequence, the code group (11001) is preferably not used in the coded 100Base-X idle PCS stream. This leaves the eight 5-bit code groups identified by the names 0, 7, 9, B, D, E, F, and R. At least part, and typically all, of these eight code groups are selectively placed in the coded 100Base-X idle PCS stream. In any case, non-I 5-bit code groups which lack non-contiguous "0s" and which are actually used in the coded 100Base-X idle PCS stream to convey station status information are referred to here as the non-I "out-of-band" code groups. The present signalling technique thus employs (a) a first code group consisting of the I code group and (b) a set of second code groups consisting of the non-I out-of-band code groups.

If suitably arranged, certain pairs of the non-I out-of-band code groups could be placed next to each other in the coded 100Base-X idle PCS stream or could be separated by a single I—i.e., the idle code group (11111)-in the coded 100Base-X idle PCS stream. For example, placing the non-I out-of-band code group (11110) directly before the non-I out-of-band code group (01111) does not result in any pair of non-contiguous "0s". Similarly, sequentially generating the non-I out-of-band code group (00111), the idle code group (11111), and then the non-I out-of-band code group (11100) does not result in any pair of non-contiguous "0s" within any 10 bits of the 15 total bits. Consequently, inserting either of these two non-I code combinations in the 100Base-X PCS stream should not lead to false assertion of carrier sense. However, placing such code combinations in the coded 100Base-X idle PCS stream places restriction that are typically undesirable on the order of the coding.

For ease in coding, two of the idle code group I normally separate each pair of consecutive non-I out-of-band code groups in the coded 100Base-X idle PCS stream. A plurality Y of the I code group also directly precedes the first non-I out-of-band code group. Y is at least 2 and, in particular, is high enough (e.g., 12) to ensure synchronism of the descrambler in the physical layer of the receiving station. At least two I code groups normally follow the last non-I out-of-band code group. The coded 100Base-X idle PCS stream therefore typically appears as follows:

YIs αI I βI I γI I δI I . . . where α, β, γ, and δ are selected ones of the non-I out-of-band code groups.

A specific example of the coded 100Base-X idle PCS stream is:

YIs B I I 9 I I F I I 7 I I . . .

The non-I out-of-band code groups can, of course, be repeated in the coded 100Base-X idle PCS stream. Accordingly, another example is:

YIs B I I 9 I I 9 I I 7 I I . . .

The coded 100Base-X idle PCS stream typically consists of separate repeated portions to provide signal robustness against noise and data corruption. All of the repeated portions may begin with the same non-I out-of-band code group to indicate the start of the sequence portion. For example, if the 0 code group (11110) represents the start of each repeated sequence portion, a typical example of the coded 100Base-X idle PCS stream is:

```
YIs  0 I I D I I B I I 9 I I 0 I I D I I B I I 9 I I

|<———First Part———>|    |<———Repeated Part———>|

0 I I D I I B I I 9 I I ...

|<———Repeated Part———>|
```

In short, the hierarchy of the coded 100Base-X idle PCS stream is as follows. The coded 100Base-X idle PCS stream is formed with a bit sequence which (as described further below) is cyclically repeated during an out-of-band period. The bit sequence consists of one or more sequence portions, each formed with multiple 5-bit segments. Each 5-bit segment is coded with the I code group or with one of the non-I out-of-band code groups according to the teachings of the invention.

Turning back to the LAN of FIG. 2, station status information dealing with the status of DTE station 12A is stored in local registers, preferably certain of management control registers 34R. PCS 34 in DTE station 12A contains a state machine 34S as shown in FIG. 3. State machine 34S processes the station status information stored in registers 34R to produce a coded 100Base-X idle PCS stream according to the invention. The physical coding sublayer in DTE station 12B likewise contains a state machine, not shown but also indicated here by reference symbol 34S, that produces a similarly coded 100Base-X idle PCS stream.

During idle (i.e., out-of-band) periods, each state machine 34S sequentially generates 5-bit sequence segments, each appropriately encoded with the code group I or with a selected one of the non-I out-of-band code groups. State machine 34S then outputs the 5-bit sequence segments according to the order in which they were generated to produce the coded 100Base-X idle PCS stream.

To avoid having DTE station 12A start to transmit real data while the coded 100Base-X idle PCS stream is being generated, state machine 34S preferably asserts a collision signal to MAC sublayer 38 of station 12A during generation of its coded 100Base-X idle PCS stream. When collision is asserted, MAC sublayer 38 defers furnishing data to PCS sublayer 34 and thereby temporarily stops station 12A from transmitting data to the outgoing one of twisted-pair cables 14.

Subsequent to generation of the coded 100Base-X idle PCS stream, the coded 100Base-X idle PCS stream produced in each DTE station 12A or 12B is scrambled, NRZI coded, and MLT-3 coded in the manner described above to reduce electromagnetic interference (without impairing the intellectual content of the encoded material). As mentioned above, the coded 100Base-X idle PCS stream is also serialized. Each station 12A or 12B then supplies the modified idle bit stream to outgoing twisted-pair cable 14 for transmission to the other station 12B or 12A.

Figure 1:
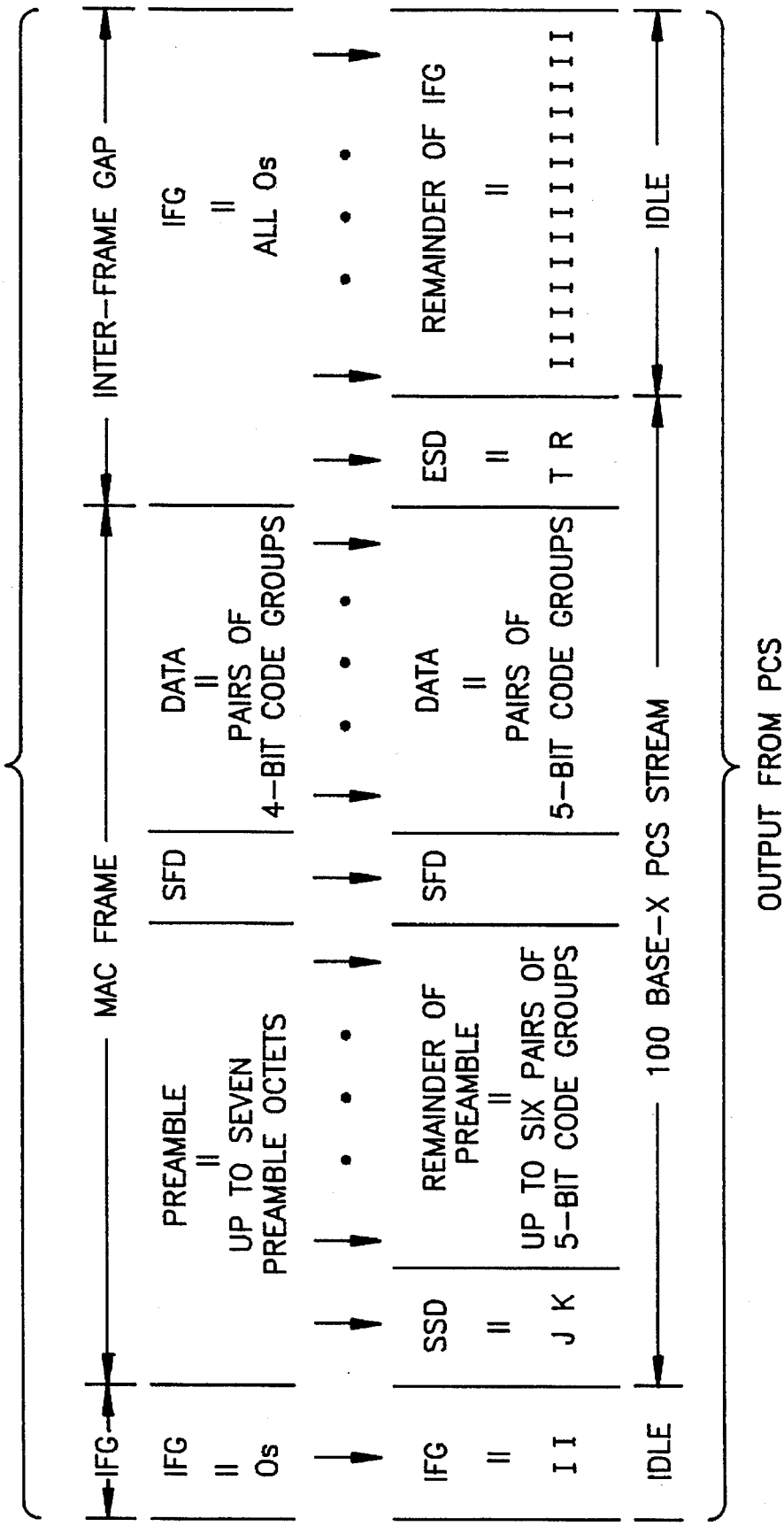
FIG. 1 is a code diagram of a MAC-to-PCS 4-bit/5-bit mapping in a LAN that utilizes the proposed 100Base-X protocol.
Figure 4:
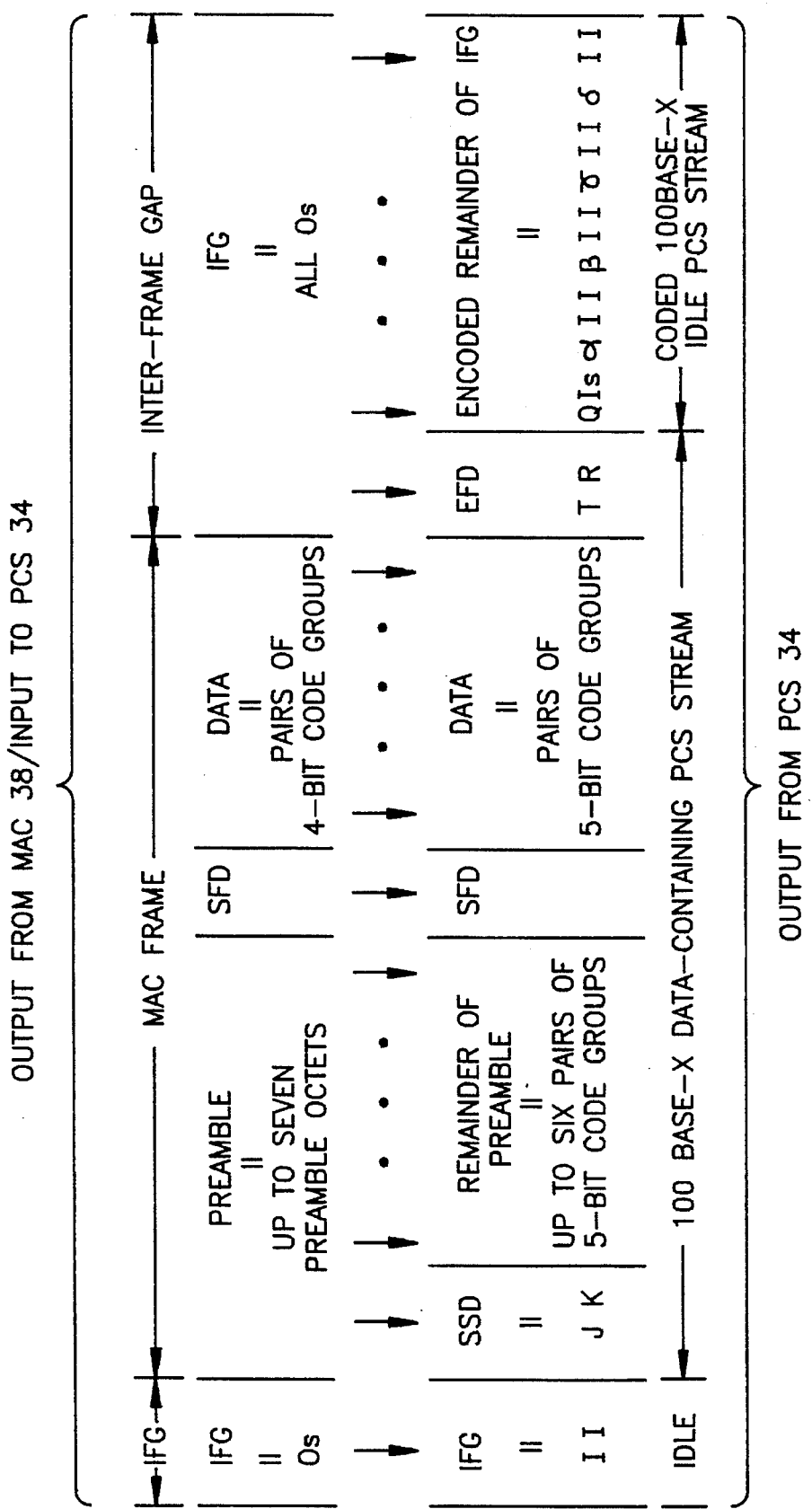
FIG. 4 is a code diagram of a MAC-to-PCS 4-bit/5-bit mapping in a LAN that employs the out-of-band signalling technique of the invention.

Starting with a plurality of the I code group, the overall 100Base-X output PCS stream appears as follows:

I I . . . I/J K/Remainder of Preamble/SFD/5-bit Data Code Groups/T R/YIs αI I βI I δI I γI I . . . where α, β, γ, and δ again are selected ones of the non-I out-of-band code groups. FIG. 4 illustrates the conversion of the output from MAC sublayer 38 into this overall 100Base-X PCS stream. Comparison of FIG. 4 to FIG. 1 indicates that there is no change in converting MAC frames into the data-containing portions of the overall PCS bit stream. The technique of the invention only affects the coded 100Base-X idle PCS stream. "IFG" in FIG. 4 again means inter-frame gap.

Upon receiving a 100Base-X bit stream provided with station status information according to the invention, a communication station that has 100Base-X capability and contains state machine 34S decodes the incoming bit stream in a manner complementary to that described above. Incoming 5-bit data segments, along with the start-of-stream and end-of-stream delimiters, are converted to 4-bit code groups according to the reverse of the mapping in Table 1. In processing the incoming information, state machine 34S recovers the station status information contained in the coded 100Base-X idle PCS stream and writes the recovered station status information into one or more of management control registers 34R.

The station status information stored in registers R typically consists of configuration capability, linkage acknowledgment, flow control parameters, and integrity control parameters. Configuration capability information includes full or half duplex as well as the basic station technology—e.g., 100Base-TX, 100Base-T4, 10Base-T, and so on. Flow control parameters include congestion and network priority. Integrity control parameters include remote loopback to check for remote fault.

Remote loopback is employed to check for a remote fault in a situation where:

(a) local DTE station 12A has been receiving information from remote DTE station 12B by way of the incoming one of cable pairs 14, thereby indicating that the communication link from station 12B to station 12A through the incoming cable pair 14 is good, (b) local station 12A is supplying the outgoing one of cable pairs 14 with information intended for remote station 12B, and (c) it is desired for local station 12A to determine whether remote station 12B is receiving outgoing information —i.e., whether there is a remote fault in the communication link through outgoing cable pair 14 or in the receiving circuitry in station 12B.

In such a situation, the integrity control information sent by local station 12A to remote station 12B during out-of-band periods according to the invention includes a remote loopback parameter that causes station 12B to attempt to send back part or all of the information that station 12B has been receiving from station 12A. The information being sent by station 12A to station 12B for return to station 12A when remote loopback is initiated by using the present signalling technique can include data as well as control information, including station status information sent by using the out-of-band signalling method of the invention. Failure of station 12A to receive this information indicates the presence of a remote fault. After determining whether there is a remote fault, station 12A can send another out-of-band parameter to station 12B to terminate the remote loopback.

The signalling technique of the invention also enables local DTE station 12A to gain control of management control registers 34R in remote DTE station 12B (and vice versa). As a result, station 12A can perform diagnostic tests on registers 34R in station 12B.

When station status information is so written into registers 34R using out-of-band signals that contain separate repetitive portions, the first one or two non-I out-of-band code groups that follow the code group representing the start of the sequence portions typically provide the address for one of the registers in stack 34R. The subsequent non-I out-of-band code groups furnish the actual station status information.

Consider the following 100Base-X idle physical stream in which the code group 0 again represents the start of repetitive sequence portions:

YIs 0 I I R I I F I I 7 I I 9 I I F I I E I I O I I R I I F I I 7 I I 9 I I F I I E I I O O . . .

The R and F code group pair following the 0 code group identifies a specific one of the thirty two registers in stack 34R. The next four non-I out-of-band code groups (7 9 F E) constitute the station status information. For example, the code segment (7 9 F E) could mean (0 13 2) which becomes (00 01 11 10) in binary.

It is typically desirable that eight ($2^3$) non-I out-of-band code groups be available for conveying the register addresses and information content for the particular ones of registers 34R into which the station status information is to be written. When one of the non-I out-of-band code groups, such as the 0 code group in the preceding example, is utilized to identify the start of separate sequence portions, that code group is generally not available for conveying register address and information content. Unless the normally invalid W code group is used, the number of non-I out-of-band code groups available for conveying register address and information content is only seven, one below the desired number. This dilemma can be solved by suitably placing more than two of the I code group between separate sequence portions to identify their starting points instead of utilizing one of the non-I out-of-band code groups to do so.

In particular, four of the I-code group are preferably inserted between repeated sequence portions that contain information for a specific one of registers 34R. When the coded 100Base-X idle PCS stream contains station status information for two or more of registers 34R, eight of the I code group are placed between consecutive sequence portions that each contain information for different ones of registers 34R. Also, twelve of the I code group are employed at the beginning of a coded 100Base-X idle PCS stream. The initial twelve I code groups are sufficient to ensure descrambling synchronization for which the 100Base-X protocol prescribes sixty "1s". This amounts to twelve I code groups.

Letting $R_1, R_2, \ldots R_x \ldots R_{XMAX}$ instantaneously represent the particular ones of management control registers 34R selected by the user to receive station status information in remote DTE station 12B, XMAX thereby being the total number of registers so selected from stack 34R the coded 100Base-X idle PCS stream typically appears as follows:

12Is R1 I I G1 I I . . GL 4Is R1 I I G1 I I . . GL
8Is R2 I I G1 I I . . GL 4Is R2 I I G1 I I . . GL
.
.
8Is RX I I G1 I I . . GL 4Is RX I I G1 I I . . GL
.
.
8Is RXMAX I I G1 I I . . GL 4Is RXMAX I I G1 I I . . . . GL . .

where (a) each RX is a non-I out-of-band code group representing the address for register $R_x$, (b) L is an integer typically equal to 6 for addressing a 16-bit register, (c) G1 - GL are non-I out-of-band code groups representing the data to be written into each register $R_x$, and (d) XMAX is no greater than 8 here (although it can be increased in the manner described below). This sequence constitutes a cycle that is usually repeated until the out-of-band period ends. The $R_x$ (or RX) reference characters are used here only to identify sequence portions that contain information for different ones of management control registers 34R and thus can represent different ones of registers 34R in different versions of the coded 100Base-X idle PCS stream.

For exemplary purposes, the sequence portion for each management control register $R_x$ is repeated once in each cycle of the preceding coded 100Base-X idle PCS stream—i.e., the total number of occurrences of the sequence portion for each register $R_x$ is two in each cycle—so as to provide protection against noise corruption. Additional noise immunity can be achieved by increasing the number of occurrences of the sequence portion for each register $R_x$ to a number greater than two in each cycle of the coded 100Base-X idle PCS stream. Alternatively, only one set of the station status information for each register $R_x$ can be furnished within each cycle of the coded 100Base-X idle PCS stream. This allows the bandwidth to be increased during in-band transmission.

With the number of non-I out-of-band code groups being eight, each non-I out-of-band code group can represent three bits. For example, the non-I out-of-band code groups can have the following meanings:

TABLE 3

| Out-of-Band Code Group Name | Bit Representation |
| --- | --- |
| 0 | 000 |
| 7 | 001 |
| 9 | 010 |
| B | 011 |
| D | 100 |
| E | 101 |
| F | 110 |
| R | 111 |

In the coded 100Base-X idle PCS stream, each 5-bit segment that is coded with a non-I out-of-band code group RX can be used to identify up to eight registers in stack 34R. Two so-coded 5-bit segments in the coded 100Base-X idle PCS stream can identify sixty-four registers. Since there are only thirty-two registers in stack 34R, two 5-bit segments coded with non-I out- of-band code groups can provide the addresses for all the registers in stack 34R.

Similarly, each 5-bit segment coded with a non-I out-of-band code group in the coded 100Base-X idle PCS stream provides three bits of register content. A 16-bit register thus needs six so coded 5-bit segments of the coded 100Base-X idle PCS stream—i.e., five coded segments for the first fifteen register bits plus one coded segment for the sixteenth register bit, two of the bits available for the last coded segment not being used.

Each 100Base-X 5-bit code group takes approximately 40 ns to complete. In the exemplary coded 100Base-X idle PCS stream given above, seven of the non-I out-of-band code groups occur in the thirty-one code groups of the first sequence portion. Sixteen bits of control information are transferred for register $R_1$ during the first sequence portion. This corresponds to an average bit transfer rate of slightly over 10 Mbps.

Figure 5:
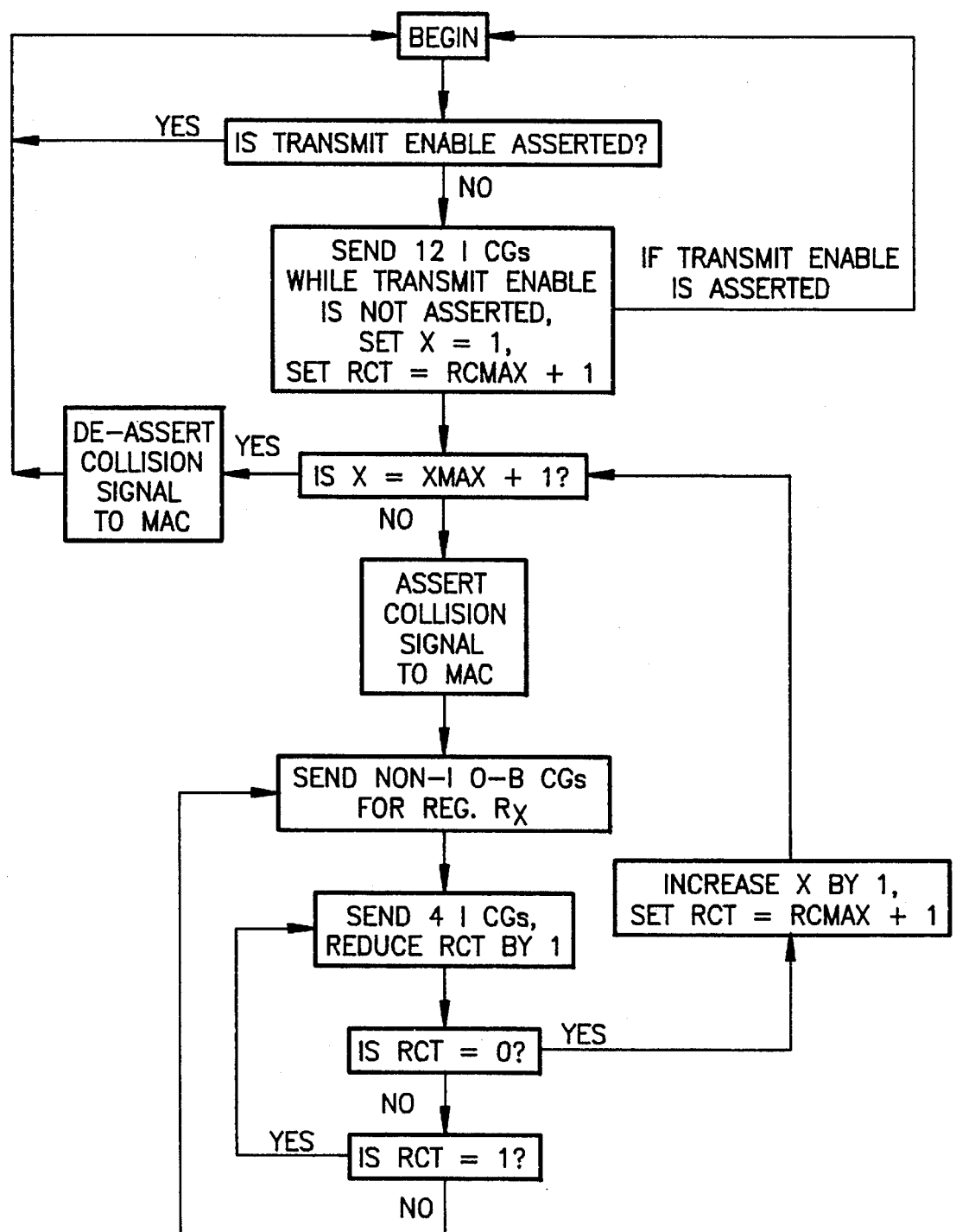
FIGS. 5 and 6 are transmit and receive state diagrams for an implementation of the present out-of-band signalling technique.

FIG. 5 illustrates a typical transmit state diagram that state machine 34S in local DTE station 12A follows in generating the preceding coded 100Base-X idle PCS stream. "CG" means code group in FIG. 5. "0-B" means out-of-band. RCMAX, which equals 2 in the preceding example, is the total number of occurrences of the sequence portion for each register $R_x$ in remote DTE station 12B during each cycle of the coded 100BaseX idle PCS stream. RCT is a transmit repeat counter variable that tracks the location in repeated sequence portions.

As indicated in FIG. 5, generation of each full cycle of the preceding code sequence causes state machine 34S to assert collision to MAC sublayer 38 and cause it to defer data transmission. State machine 34S de-asserts collision after each full cycle is completed.

Figure 6:
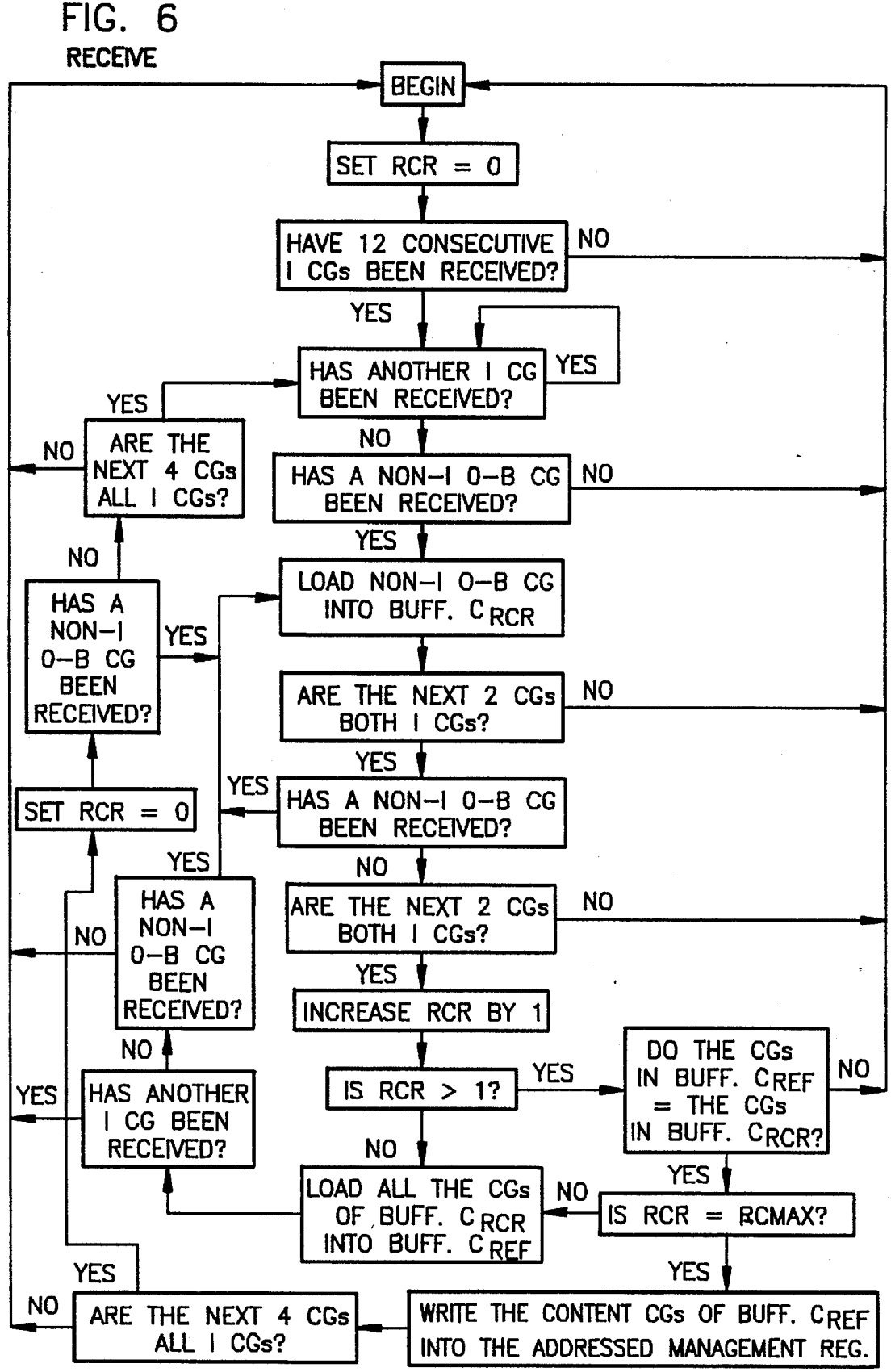

FIG. 6 depicts a typical receive state diagram that state machine 34S in DTE station 12A (or 12B) follows to process 5-bit code groups contained in a 100Base-X bit stream received from DTE station 12B (or 12A) by way of incoming cable pair 14. "CG" and "0-B" again respectively mean code group and out-of-band. RCR is a receive repetition counter variable that tracks the location in repeated sequence portions within each cycle of the coded 100Base-X idle PCS stream.

In processing the 5-bit code groups in the incoming coded 100Base-X idle PCS stream, state machine 34S loads the sequence portion for each management control register $R_x$ into a buffer register $C_{RCR}$ located in state machine 34S. Before loading the second and any subsequent repetition of the sequence portion for register $R_x$ into buffer $C_{RCR}$, state machine 34S loads the immediate prior sequence portion for register $R_x$ into another buffer register $C_{REF}$. After loading the second and any subsequent repetition of the sequence portion for register $R_x$ into buffer $C_{RCR}$, state machine 34S compares the code groups in buffer $C_{REF}$ to the code groups in buffer $C_{RCR}$. If the code groups in buffer $C_{REF}$ match those in buffer $C_{RCR}$ all the way through the loading of the last sequence portion for register $R_x$ into buffer $C_{RCR}$, station status information RX and G1-GL in buffer $C_{REF}$ is decoded, for example, according to Table 3. The decoded station status information corresponding to code groups represented by the content characters G1-GL is written into the particular one of registers 34R indicated by the decoded address information corresponding to the code group represented by the address character RX.

As indicated in FIG. 6, state machine 34S terminates the attempt to write information into management control registers 34R if the code groups in buffer $C_{REF}$ fail to match those in buffer $C_{RCR}$ at any point where a comparison is made. Examination of FIG. 6 also shows that state machine 34S terminates the attempt to write information into registers 34R upon determining other items which indicate that the values of the incoming code groups are not of the proper nature. For example, state machine 34S returns to the starting point if the two code groups following a non-I out-of-band code group are anything but I code groups.

Instead of loading the non-I out-of-band code groups directly into buffer $C_{RCR}$ and later into buffer $C_{REF}$, the non-I out-of-band code groups can be decoded, for example, according to Table 3 and then loaded into buffer $C_{RCR}$ and later into buffer $C_{REF}$. This allows the lengths of buffer registers $C_{RCR}$ and $C_{REF}$ to be reduced, typically by about 40%. The portion of the $C_{REF}$ contents corresponding to code groups represented by the content characters G1 - GL is then written directly into the particular management register 34R identified by the portion of the $C_{REF}$ contents corresponding to the code group represented by the address character RX.

Figure 7:
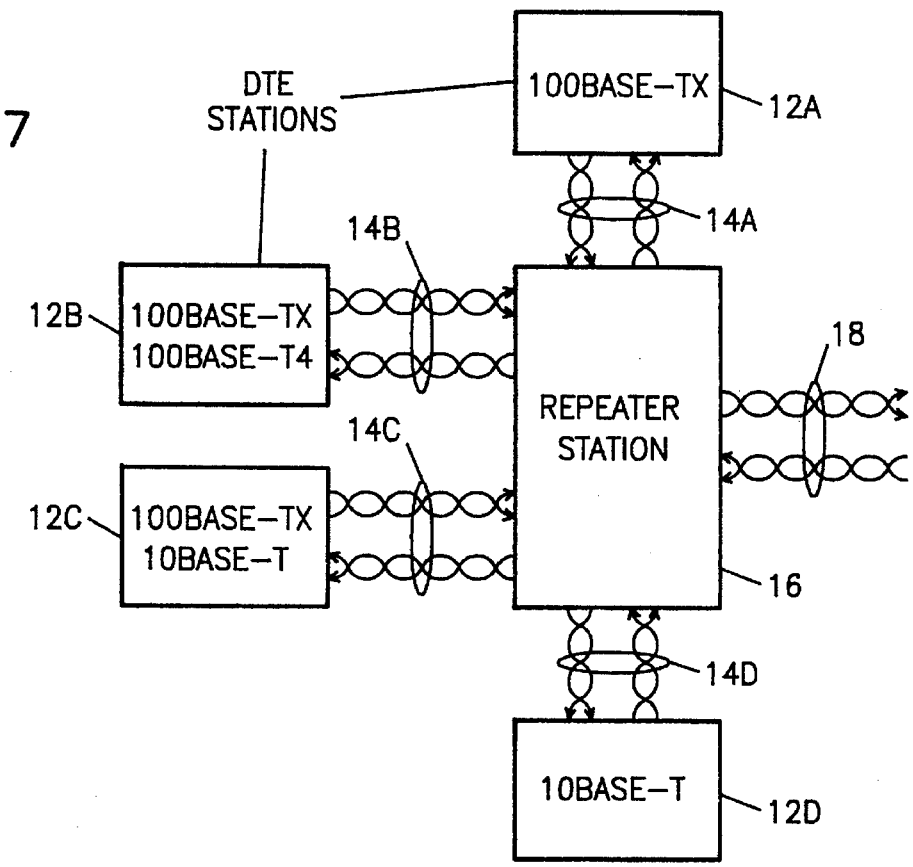
FIG. 7 is a system diagram of a repeater-based LAN that can utilize the out-of-band signalling method of the invention.

FIG. 7 depicts part of a repeater-based LAN in which the out-of-band signalling technique of the invention is employed for exchanging station status information. The portion of the LAN shown in FIG. 7 consists of a repeater communication station 16 and four DTE communication stations 12A, 12B, 12C and 12D. Twisted-pair copper cable pairs 14A, 14B, 14C, and 14D respectively connect DTE stations 12A–12D to repeater station 16. A twisted-pair copper cable pair 18 connects repeater station 10 to the (unshown) remainder of the LAN.

As with the LAN in FIG. 2, the components of the LAN in FIG. 7 transfer information in accordance with various twisted-pair protocols of IEEE Standard 802.3. DTE stations 12A–12C communicate according to 100Base-TX and are all provided with capabilities for high-speed out-of-band signalling according to the invention. Station 12B is again further capable of communicating according to 100Base-T4. Station 12C is further capable of communicating according to 10Base-T. Station 12A and the 100Base-TX portions of stations 12B and 12C are internally organized as shown in FIG. 3. DTE station 12D can only communicate according to 10Base-T and lacks the present out-of-band signalling capability.

Figure 8:
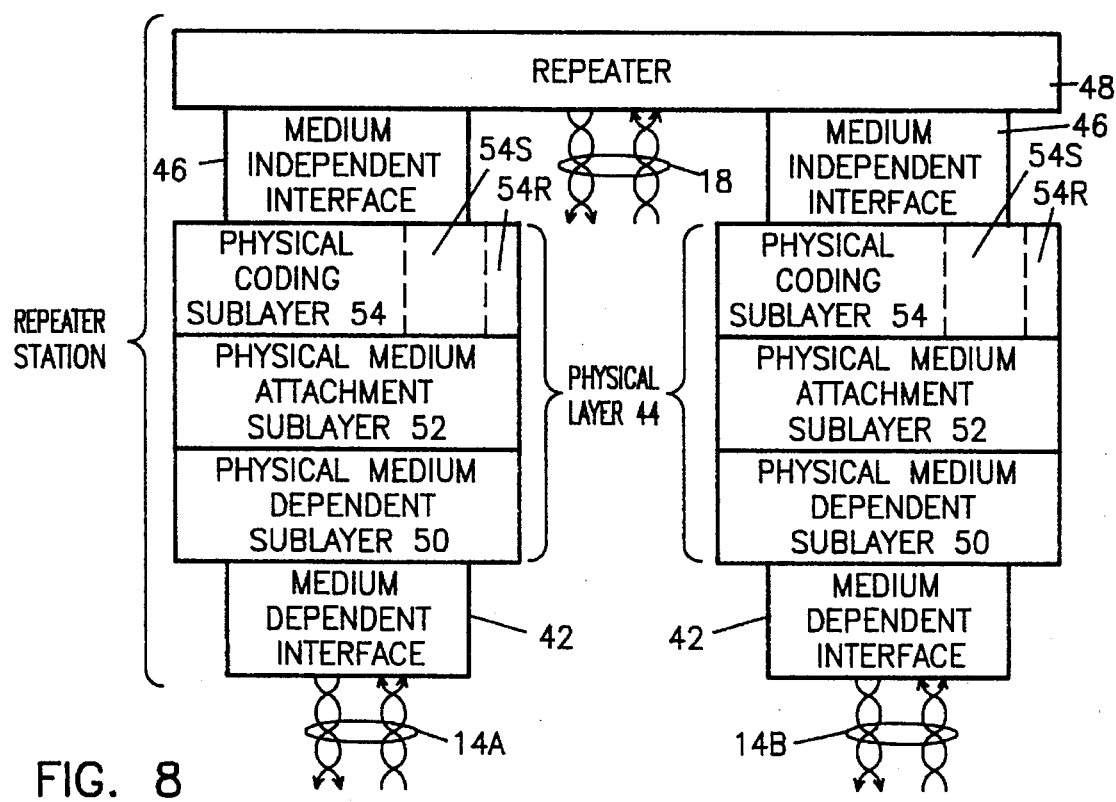
FIG. 8 is a block diagram of a repeater communication station suitable for use in the LAN of FIG. 7 for out-of-bond signalling in accordance with the invention.

Repeater station 16 is furnished with the out-of-band signalling capability of the invention. The internal organization of repeater station 16 is shown in FIG. 8.

Repeater station 16 contains a plural number of medium dependent interfaces 42, a like plural number of physical layers 44, another like plural number of medium independent interfaces 46, and a repeater 48. For simplicity, only two medium dependent interfaces 42, two physical layers 44, and two medium independent interfaces 46 are depicted in FIG. 5. Each physical layer 44 is formed with a physical medium independent sublayer 50, a physical medium attachment sublayer 52, and a physical coding sublayer 54. Physical layers 44 may be merged into one integrated circuit. Subject to the enhancements of the invention, repeater station 16 generally meets the operational and performance specifications of the 100Base-TX protocol. Again see "MAC Parameters, Physical Layer, Medium Attachment Units and Repeater for 100 Mb/s Operation (version 1.0)", cited above.

DTE station 12C and repeater station 16 utilize the present-out-of-band signalling technique in the same way as described above for stations 12A and 12B. The physical coding sublayer in station 12C contains an out-of-band state machine and a stack of thirty-two 16-bit management control registers that operate in the same way as state machine 34S and register stack 34R in station 12A. PCS 54 in each physical layer 44 of repeater station 16 contains an out-of-band state machine 54S and a stack 54R of thirty-two 16-bit management control registers. State machine 54S and registers 54R likewise operate in the same manner as state machine 34S and registers 34R in station 12A to implement the out-of-band signalling method of the invention.

The present signalling technique can be employed in various ways. For example, a communication station having both 100Base-X capability and the out-of-band signalling capability of the invention can utilize the present signalling technique immediately after station power-up. If the station receives similar out-of-band information from a cable connected to a remote communication station having 100Base-X capability, the two stations can exchange station status information so as to communicate in an efficient manner.

Alternatively, if the first-mentioned station also has the NWay autodetect capability, the station can initially use the NWay technique. If NWay is successfully used to set up a communication link with a remote communication station having 100Base-X capability and the out-of-band signalling capability of the invention, the two stations can again subsequently employ the present signalling method to communicate efficiently. The two stations can thus renegotiate (if needed) the link conditions without having to interrupt the communication link as is necessary in NWay. In this way, the present invention complements NWay.

ALAN containing data-transferring communication stations, such as DTE stations 12A–12C and repeater station 16, that are provided with the out-of-band signalling capability of the invention, may include a communication-management station likewise furnished with the present out-of-band signalling capability. The communication-management station employs the out-of-band signalling capability to assign priorities to determine when each data-transferring station in the LAN can transmit data to another of the data-transferring stations in the LAN. In particular, the communication-management station provides (by way of suitable cables) each of the data-transferring stations with a serial bit sequence that represents a version of the coded 100Base-X idle PCS stream tailored to that station's communication priority. An example of a communication network priority that can be so controlled is the minimum width of the inter-frame gap for each of the data-transferring communication stations.

While the invention has been described with reference to particular embodiments, this description is solely for the purpose of illustration and is not to be construed as limiting the scope of the invention claimed below. For example, the 100Base-FX fiber-cable protocol uses the same 4-bit/5-bit MAC-to-PCS mapping (and vice versa) as the 100Base-TX protocol. Accordingly, the invention can be employed to exchange station status information with communication stations that operate according to the 100Base-FX protocol but do not have 100Base-TX capability. The invention can also be applied to token ring LANs that follow the FDDI standard.

LAN configurations besides that shown in FIG. 2 can employ the invention. Certain types of repeaters may be able to pass station status information from one DTE station to another DTE station by using the present signalling technique. Instead of using registers intended for NWay, a communication station can have separate registers for storing station status information transferred according to the invention.

During 100Base-X data transmission, the scrambling, NRZI coding, and serialization operations could be performed in a different order to that given above. The same applies to the descrambling, NRZI decoding, and de-serialization operations during 100Base-X data reception.

In the implementation where more than two of the I code group are inserted between separate sequence portions to identify their starting points, the number of the I code group inserted between repeated sequence portions that contain information for a single register can be different than four. Similarly, the number of the I code group placed between consecutive sequence portions that each contain information for all the addressed registers can be different than eight. More than twelve of the I code group can precede the start of a coded 100Base-X idle PCS stream.

Also, the end of the register address field and the beginning of the register content field in each portion of the coded 100Base-X idle PCS stream can be demarcated by arranging for the number of I code groups between the register address field and the register content field to differ from the number of consecutive I code groups used elsewhere in the coded 100Base-X idle PCS stream. For example, six of the I code group could be placed between the register address field and the register content field in each sequence portion. Consequently, state machine 34S in the receiving communication station does not need to know the particular number of 5-bit segments that are coded with non-I out-of-band code groups to represent the register address field.

The first and second binary values could respectively mean "0" and "1" instead of "1" and "0". Certain types of control information other than that indicating start/stop of data transmission could be transmitted during in-band periods. The invention could be used in communication systems other than LANs. Various modifications and applications may thus be made by those skilled in the art without departing from the true scope and spirit of the invention as defined in the appended claims.

We claim:

1. A signalling method comprising the steps of:
   sequentially generating n-bit sequence segments where n is at least 3, each bit in each sequence segment selectively being a first binary value or a second binary value opposite to the first binary value, each sequence segment being coded with a selected one of a plurality of different n-bit code groups allocated into a first code group and a set of second code groups, the n bits in the first code group all being the first binary value, no pair of non-contiguous bits of the second binary value occurring in any of the second code groups; and
   outputting the sequence segments according to the order in which they are generated to produce a special bit sequence.

2. A method as in claim 1 wherein no pair of non-contiguous bits of the second binary value occur in any m consecutive bits in the special bit sequence, m being at least n+1.

3. A method as in claim 2 wherein m equals 2n.

4. A method as in claim 2 wherein at least two sequence segments coded with the first code group are inserted between each pair of sequence segments coded with the second code groups in the special bit sequence.

5. A method as in claim 1 wherein:
   the special bit sequence contains a plurality of separate portions, each being at least two of the second code groups in length; and
   a specified one of the second code groups occurs at the beginning of all the separate portions to indicate the start of each separate portion.

6. A method as in claim 5 wherein two sequence segments coded with the first code group are between each pair of sequence segments coded with the second code groups in each separate portion of the special bit sequence.

7. A method as in claim 4 wherein:
   the special bit sequence contains a plurality of separate portions, each being at least two of the second code groups in length; and
   a selected plurality of more than two of the first code groups is inserted between each pair of consecutive separate portions to indicate the start of each separate portion after the first one.

8. A method as in claim 7 wherein two sequence segments coded with the first code group are between each pair of sequence segments coded with the second code groups in each separate portion of the special bit sequence.

9. A method as in claim 1 wherein a first communication station transmits a bit stream representing the special bit sequence to a second communication station during an out-of-band period.

10. A method as in claim 9 wherein the second code groups convey information particular to the first station.

11. A method as in claim 10 wherein the conveyed information comprises station configuration information.

12. A method as in claim 11 wherein the conveyed information includes data flow information.

13. A method as in claim 9 wherein the special bit sequence includes loopback information that attempts to cause the second station to transmit back to the first station information that the first station has previously transmitted to the second station.

14. A method as in claim 9 wherein n is 5.

15. A method as in claim 9 wherein the first station is capable of transmitting information in accordance with the 100Base-X protocol.

16. A method as in claim 15 wherein:

the first code group is the 5-bit code group I of the 100Base-X protocol; and the second code groups include at least part of the 5-bit code groups 0, 7, 9, B, D, E, F, and R of the 100Base-X protocol.

17. A method as in claim 16 wherein the second code groups include the 5-bit code group (11001).

18. A method as in claim 15 wherein the number of second code groups is eight, each second code group representing a different three-bit code.

19. A method as in claim 15 wherein at least twelve of the first code group precede the special bit sequence.

20. A method as in claim 15 wherein the second station, upon receiving information transmitted from the first station in accordance with the 100Base-X protocol, is capable of processing the received information in accordance with the 100Base-X protocol, the reception in the second station of the bit stream representing the special bit sequence not causing carrier sense to be asserted in the second station.

21. A method as in claim 9 further including the step of producing an additional special bit sequence having characteristics of the same type as the first-mentioned special bit sequence except that the organization of the second code groups in the additional sequence may differ from that in the first-mentioned sequence, the second station transmitting a bit stream representing the additional sequence to the first station.

22. A method as in claim 1 wherein:

a plurality of data-transferring communication stations are interconnected with a communication-management station in a communication network, each of the data-transferring stations being capable of transmitting data to at least one other data-transferring station in the network; and communication-management station transmits a bit stream representing the special bit sequence to each of the data-transferring communication stations to establish communication priorities for transferring data among the data-transferring stations, the special bit sequence varying in content for each data-transferring station depending on its communication priority.

23. A signalling method comprising the step of producing a special bit sequence containing a plurality of 5-bit segments that occur timewise one after another, each bit in each sequence segment selectively being a first binary value or a second binary value opposite to the first binary value, each sequence segment being coded with a selected one of a plurality of different 5-bit code groups comprising a first code group and a set of second code groups, the five bits in the first code group all being the first binary value, no pair of non-contiguous bits of the second binary value occurring in any of the second code groups, and no pair of non-contiguous bits of the second binary value occurring in any ten consecutive bits in the special bit sequence.

24. A method as in claim 23 wherein:

the first code group is the 5-bit code group I of the 100Base-X protocol; and the second code groups include at least part of the 5-bit code groups 0, 7, 9, B, D, E, F, and R of the 100Base-X protocol.

25. Electronic communication apparatus comprising:

state circuitry which produces a special bit sequence containing a plurality of n-bit sequence segments that occur timewise one after another where n is at least 3, each bit in each sequence segment selectively being a first binary value or a second binary value opposite to the first binary value, each sequence segment being coded with a selected one of a plurality of different n-bit code groups allocated into a first code group and a set of second code groups, the n bits in the first code group all being the first binary value, and no pair of non-contiguous bits of the second binary value occurring in any of the second code groups; and output circuitry which modifies the special bit sequence for cable transmission and then furnishes the so modified special bit sequence to an external cable.

26. Apparatus as in claim 25 wherein no pair of non-contiguous bits of the second binary value occurs in any m consecutive bits in the special bit sequence, m being at least n+1.

27. Apparatus as in claim 26 wherein m equals 2n.

28. Apparatus as in claim 26 wherein at least two sequence segments coded with the first code group are between each pair of sequence segments coded with the second code groups.

29. Apparatus as in claim 25 wherein:

n is 5;

the first code group is the 5-bit code group I of the 100Base-X protocol; and the second code groups include at least part of the 5-bit code groups 0, 7, 9, B, D, E, F, and R of the 100Base-X protocol.

30. Apparatus as in claim 29 wherein the second code groups include the 5-bit code group (11001).

31. Apparatus as in claim 29 wherein the number of second code groups is eight, each representing a different three-bit code.

32. Apparatus as in claim 29 wherein at least twelve of the first code group precede the special bit sequence.

33. Apparatus as in claim 25 wherein the apparatus transmits data during in-band periods and repetitively transmits the special bit sequence during out-of-band periods.

34. Apparatus as in claim 33 wherein the second code groups convey information particular to the apparatus.

35. A communication network comprising:

a transmission cable;

a first communication station that transmits a bit stream representing a special bit sequence over the cable during an out-of-band period when data is not being transferred, the special bit sequence containing a plurality of n-bit sequence segments that occur timewise one after another where n is at least 3, each bit in each sequence segment selectively being a first binary value or a second binary value opposite to the first binary value, each sequence segment being coded with a selected one of a plurality of different n-bit code groups comprising a first code group and a set of second code groups, the n bits in the first code group all being the first binary value, and no pair of non-contiguous bits of the second binary value occurring in any of the second code groups; and a second communication station to which the cable supplies the bit stream representing the special bit sequence.

36. A network as in claim 35 wherein no pair of non-contiguous bits of the second binary value occur in any m consecutive bits in the special bit sequence, m being at least n+1.

37. A network as in claim 35 wherein the second station transmits an additional special bit sequence to the first station during an out-of-band period, the additional special bit sequence having substantially the same characteristics as the first-mentioned special bit sequence except that the arrangement of the first and second code groups in the additional special bit sequence may differ from that in the first-mentioned special bit sequence.

38. A network as in claim 37 wherein:

the first code group is the 5-bit code group I of the 100Base-X protocol; and the second code groups include at least part of the 5-bit code groups 0, 7, 9, B, D, E, F, and R of the 100Base-X protocol.

39. A communication network comprising:

a plurality of data-transferring communication stations, each capable of transmitting data to at least one other data-transferring communication station in the network; and a communication-management station that provides a bit stream representing a special bit sequence containing a plurality of n-bit sequence segments that occur timewise one after another where n is at least 3, each bit in each sequence segment selectively being a first binary value or a second binary value opposite to the first binary value, each sequence segment being coded with a selected one of a plurality of different n-bit code groups comprising a first code group and a set of second code groups, the n bits in the first code group all being the first binary value, and no pair of non-contiguous bits of the second binary value occurring in any of the second code groups, the bit stream being supplied to each of the data-transferring communication stations to establish communication priorities for transferring data among the data-transferring stations, the special bit sequence varying in content for each data-transferring station depending on its communication priority.

40. A network as in claim 39 wherein no pair of non-contiguous bits of the second binary value occur in any m consecutive bits in the special bit sequence, m being at least n+1.

41. A network as in claim 39 wherein the communication priorities comprise establishing minimum widths for out-of-band periods between periods during which one of the data-transferring stations transmits data to another of the data-transferring stations.

42. A network as in claim 39 wherein:

the first code group is the 5-bit code group I of the 100Base-X protocol; and the second code groups include at least part of the 5-bit code groups 0, 7, 9, B, D, E, F, and R of the 100Base-X protocol.

* * * * *